US008774864B2

(12) United States Patent
Kumar

(10) Patent No.: US 8,774,864 B2
(45) Date of Patent: Jul. 8, 2014

(54) LOCKING OF COMMUNICATION DEVICE

(75) Inventor: Praveenya Kumar, Bangalore (IN)

(73) Assignee: ST-Ericsson SA, Geneva (CH)

( * ) Notice: Subject to any disclaimer, the term of this patent is extended or adjusted under 35 U.S.C. 154(b) by 290 days.

(21) Appl. No.: 13/141,637

(22) PCT Filed: Dec. 23, 2009

(86) PCT No.: PCT/IN2009/000739
§ 371 (c)(1),
(2), (4) Date: Jun. 22, 2011

(87) PCT Pub. No.: WO2010/073265
PCT Pub. Date: Jul. 1, 2010

(65) Prior Publication Data
US 2011/0256906 A1    Oct. 20, 2011

(30) Foreign Application Priority Data

Dec. 24, 2008  (IN) .......................... 3274/CHE/2008

(51) Int. Cl.
*H04W 88/02* (2009.01)
(52) U.S. Cl.
USPC ....................................... 455/558
(58) Field of Classification Search
USPC ......... 455/558, 557, 418, 419, 405, 410, 411, 455/414.1, 435.1
See application file for complete search history.

(56) References Cited

U.S. PATENT DOCUMENTS

| 6,741,872 | B1 | 5/2004 | Pinault |
| 8,149,085 | B2 * | 4/2012 | Ould ............................ 340/5.31 |
| 8,190,141 | B2 * | 5/2012 | Krause et al. ................. 455/419 |
| 8,365,258 | B2 * | 1/2013 | Dispensa .......................... 726/5 |
| 2004/0042604 | A1 | 3/2004 | Hiltunen |
| 2006/0293030 | A1 | 12/2006 | Cantini |

FOREIGN PATENT DOCUMENTS

| WO | 2006031898 A2 | 3/2006 |
| WO | 2007050272 A2 | 5/2007 |

* cited by examiner

*Primary Examiner* — Melody Mehrpour
(74) *Attorney, Agent, or Firm* — Coats and Bennett, P.L.L.C.

(57) ABSTRACT

A communication system for implementing locking of a device (102) is described. The device (102) can be locked to a network service provider for a validity period. After expiry of the validity period, the device (102) can be automatically unlocked. In locked mode of operation, an integrated circuit (IC) card tool-kit (214) that is used for housing the IC card, is disabled in the device (102). During the validity period, the device (102) transmits an equipment identity number to the network service provider while initiating a request for communication. The network service provider dynamically allocates a subscriber identity number to facilitate communication process. After expiry of the validity period, the device (102) is unlocked automatically and the IC tool-kit (214) of the device (102) is enabled.

6 Claims, 6 Drawing Sheets

LOCKING OF COMMUNICATION DEVICE

TECHNICAL FIELD

The subject matter described herein, in general, relates to restricting activity of a communication device and, in particular, relates to locking a communication device for a time period to a particular communication network.

BACKGROUND

Networked communication is an indispensable means of information exchange in today's society. In a typical networked communication system, remote communication devices communicate via a wired or wireless connection over a network operated by a network service provider. Various network service providers use different methods to authenticate the devices for use over their network.

In a typical networked communication system, such as in a Global System of Mobile (GSM) based mobile communication system, the network service provider gives a Subscriber Identity Module (SIM) in the form of an integrated circuit (IC) card to a user. When the communication device initiates a communication request, a unique International Mobile Subscriber Identity (IMSI) number, stored in the IC card of the communication device, is transmitted over the network to the network service provider.

Many a times, the network service providers offer a subsidy in the form of subsidized mobile phones to users and price it such that the cost of subsidizing is recovered over a period of time through operating profits earned from service charges. To ensure effective recovery of the subsidy, the communication device is locked to the network service provider for a predetermined time period, i.e., the communication device cannot be used with a different network service provider during the predetermined time period.

In order to unlock the locked communication device, such as upon expiry of the predetermined time period, different unlocking methods are used. In one method, the memory of the communication device is reconfigured using a specialized equipment. In order to carry out such methods, the communication device needs to be physically taken to a service center. In another method, the communication device may include a password protected unlocking module. A password for activating the password protected unlocking module is set by the network service provider. In order to unlock the communication device, the user needs to request for the password from the network service provider.

Thus, all conventionally known unlocking methods usually involve one or more visits to the service center, and lead to wastage of time and cause inconvenience to the user. Also, such unlocking methods requires an action to be carried out by either the user, or the network service provider, or both, thus making the unlocking method time consuming, cumbersome, and results in delays.

Further, some of the locked communication devices are prone to hacking by individuals using methods commonly available over Internet. In this case, the network service provider is unable to effectively recover the cost of subsidizing the communication device.

SUMMARY

Described herein is a communication system for implementing virtual locking and unlocking of the communication device. In one embodiment, virtual locking and unlocking methods are implemented such that the communication device can be operated without an IC card, such as a SIM card, during a locked mode of operation. A tool kit of the communication device to house the IC card, referred to as an IC tool kit hereinafter, is used for locking or unlocking the communication device. During the locked mode of operation, the IC tool kit is disabled. Thus, the communication device can be used only on a network of the network service provider based on an equipment identification number of the communication device. During the locked mode, the communication device transmits the equipment identification number to a server of a communication network. The communication network server dynamically allocates an IMSI number in response to the equipment identification number to facilitate the communication process.

The communication device can be unlocked automatically, without any trigger, after expiry of the validity period and the IC tool kit is enabled. After expiry of the validity period, unlocking is implemented automatically, i.e., without requiring an initiation on part of either a user of the communication device or the network service provider. Time period of the validity period is stored in a memory of the communication device.

BRIEF DESCRIPTION OF THE DRAWINGS

The subject matter is described in detail with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
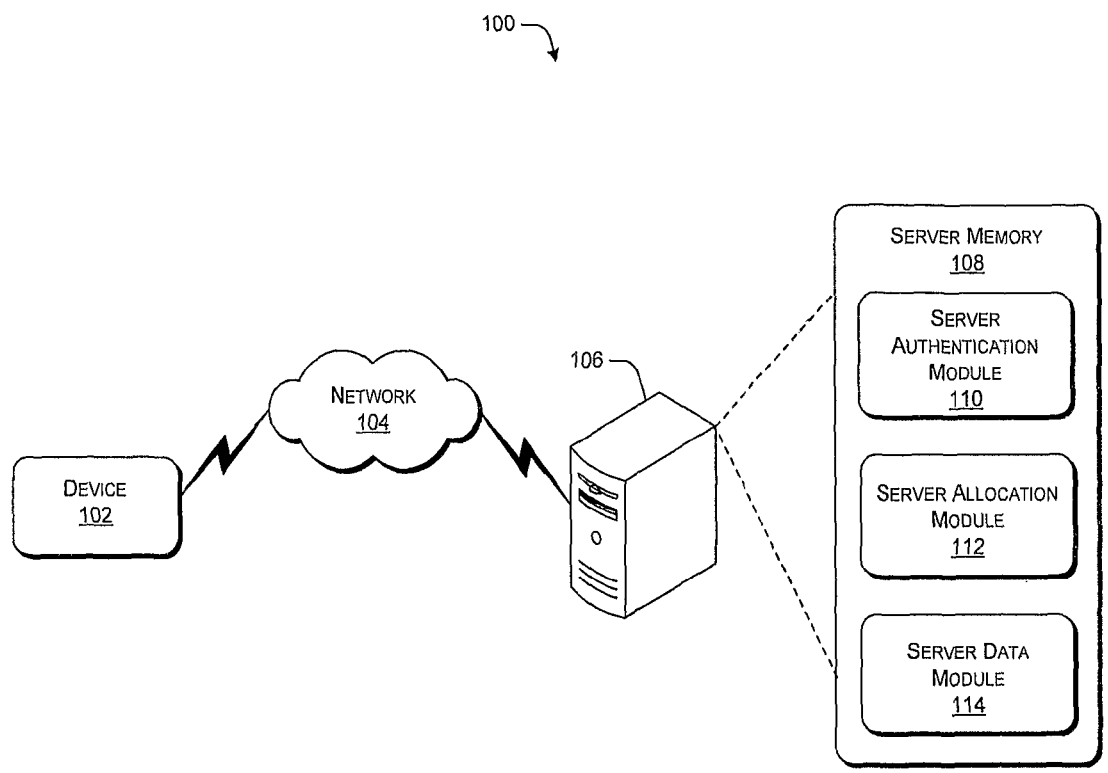
FIG. 1 illustrates an exemplary system implementing virtual locking of a communication device, in accordance with one embodiment of the subject matter.

The disclosed subject matter relates to virtual locking of communication devices. The exemplary methods and systems are described below with reference to communication devices that may be used in any wireless or wired communication system. A communication device, such as a mobile phone, a set top box, and a modem, allows a user to communicate over a wired or wireless network provided by a network service provider. For the purpose of establishing a connection, the communication device is authenticated by the network service provider and thereafter services are made available to the user. As per the business requirements, the network service provider may lock the communication device to its network for a predetermined time period. The predetermined time period is referred to as a validity period hereinafter.

For the purpose of illustration, the network service provider to which the communication device is locked is referred to as a home network service provider. Any different network service provider, other than the home network service provider, has been referred to as a non-home network service provider.

During the validity period, the communication device cannot authenticate itself on the non-home network service provider using the IC card offered by the non-home network service provider. For the purpose, the user of the communication device and the home network service provider may enter into a contract and during the validity period of the contract, the user's communication device is locked to the home network service provider.

One of the methods to lock the communication device to a communication network, which is compatible with the standard(s) promulgated by GSM, includes storing an IMSI number in a memory of the communication device. The IMSI number stored in the memory is the same as the IMSI number stored in the IC card.

In this method, transmission of the IMSI number, for authentication of the communication request, is allowed only after validating the IMSI number stored in the IC card against the IMSI number stored in the memory of the communication device locked to the network service provider. This network bound communication device is also referred to as a locked communication device. As a result, the locked communication device can be used only with the IC card provided by the network service provider. This is usually referred to as an IC card dependent method, since the communication device is locked to the network service provider through the IC card. Other electronic communication devices, such as set top boxes, and wireless modems, also use similar methods to lock the device to a particular service provider.

The subject matter described herein relates to a system and method to restrict functioning of the communication device, such as a mobile phone, to the network of the home network service provider in a way that does not require the IC card to be present inside the communication device. The restriction on the functioning can be made reversible, since the restriction is designed to be withdrawn automatically, i.e., without requiring any initiation from the user or the home network service provider, after expiry of the validity period. Till the expiry of the validity period, the device is locked to the home network service provider. After the expiry of the validity period, the communication device gets automatically unlocked without any intervention from the user or the home network service provider. Thereafter, the user is free to use the communication device with a different IC Card provided by either the home or the non-home network service provider.

FIG. 1 illustrates an exemplary system 100 implementing virtual locking of the communication device 102, according to one embodiment. The system 100 includes the communication device 102, also referred to as a device 102 hereinafter, communicatively coupled to a communication server 106 via a communication network 104. The device 102 may be an electronic equipment, for example, a cellular telephone, cordless telephone, wireless radio transceiver, wired or wireless network modem, set top box.

Though the following description has been provided with reference to a cellular communication system as an example, it will be understood that the system 100 can be implemented in any communication system, such as data communication system, or video communication system, using any communication device.

The network 104 may be a wired network, a wireless network, or an interconnected hybrid network comprising of wireless and wired networks. The network 104 may be a dedicated one, i.e., provided and maintained by a single network service provider, or a shared one, i.e., provided and maintained by a number of network service providers. The device 102 can be used by the user who is a user of at least one of the network service providers operating on the network 104. In the case of cellular telephony, the device 102 may communicate over the network 104 through a multitude of Base Transceiver Stations (BTSs) and Base Station Controllers (BSCs).

The network 104 is communicatively coupled to a communication server 106. The communication server 106, also referred to as server 106 hereinafter, may be implemented through various computing devices including, but not limited to, a general purpose computing device, multiple networked servers (arranged in clusters or as a server farm), a mainframe, and so forth. The server 106 may be a dedicated server, for example, provided and maintained by a single service provider, or it may be a shared server, for example, provided and maintained by a number of service providers.

The server 106 includes a server memory 108, which stores various modules such as an authentication module 110, an allocation module 112, and a server data module 114. The server memory 108 can be a combination of any known types of memory systems and a part of the server memory 108 may be hosted on a computing device that is physically separated from the server 106.

For the purposes of illustration, consider a cellular telephony system, wherein the device 102 is a cellular phone, the network 104 is a shared network monitored by a number of network service providers, and the server 106 is a server maintained by the home network service provider. In order to establish a connection, for example, to make a voice call or to send a message over the network 104, the communication device 102 first transmits the communication request for authentication to the server 106 of the home network service provider. When the device 102 is locked to the home network service provider, the device 102 is not authenticated by any other server that does not belong to the home network service provider.

In the locked mode, in one embodiment, the device 102 can be authenticated by the server 106, provided by the home network service provider, without requiring an IC card to be present in the device 102. For authentication, the device 102 transmits an equipment identification number (EIN), such as an International Mobile Equipment Identity (IMEI) number, over the network 104 to the server 106.

The authentication module 110 in the server 106 determines whether the IMEI number corresponds to an equipment that is locked to the home network service provider by comparing the IMEI number with a list of valid IMEI numbers stored in a database of the server data module 114. On successful authentication, the IMEI number is forwarded to the allocation module 112 for dynamic allocation of a temporary International Mobiles Subscriber Identity (IMSI) number corresponding to the received IMEI number. Using the IMSI number, the device 102 is able to communicate successfully over the network 104.

The allocation module 112 maps the temporary IMSI number with the IMEI number of the device 102 based on a list of available IMSI numbers stored in the database of the server data module 114. For authentication and allocation of the temporary IMSI number, the authentication module 110 and the allocation module 112 may use a series of authentication and encryption algorithms known in the art. Once the connection is to be refreshed, a new IMSI number may be allocated to the device 102 by mapping a new available IMSI number with the IMEI number of the device 102.

Thus the device 102 is locked to the home network service provider based on the IMEI number of the device 102 during the validity period. Further, to ensure that the user does not use any other IC card with the locked device 102, the IC tool kit required to operate the IC card is blocked. One exemplary mechanism to lock the device 102 has been explained in detail below with reference to FIG. 2.

Though the above description has been provided with reference to the IMEI number and the temporary IMSI number, it is understood that the system can be implemented using any equipment identification number associated with the device 102 and any subscriber identification number associated with the home network service provider.

In one implementation, the device 102 can be locked to the home network service provider such that the locking can be withdrawn automatically after expiry of the validity period, i.e., no action is required on part of either the user or the home network service provider to carry out unlocking. Once locking is automatically withdrawn after expiry of the validity period, the device 102 can operate with any other IC card in a manner similar to any other conventional communication equipment available in the prior art.

Figure 2:
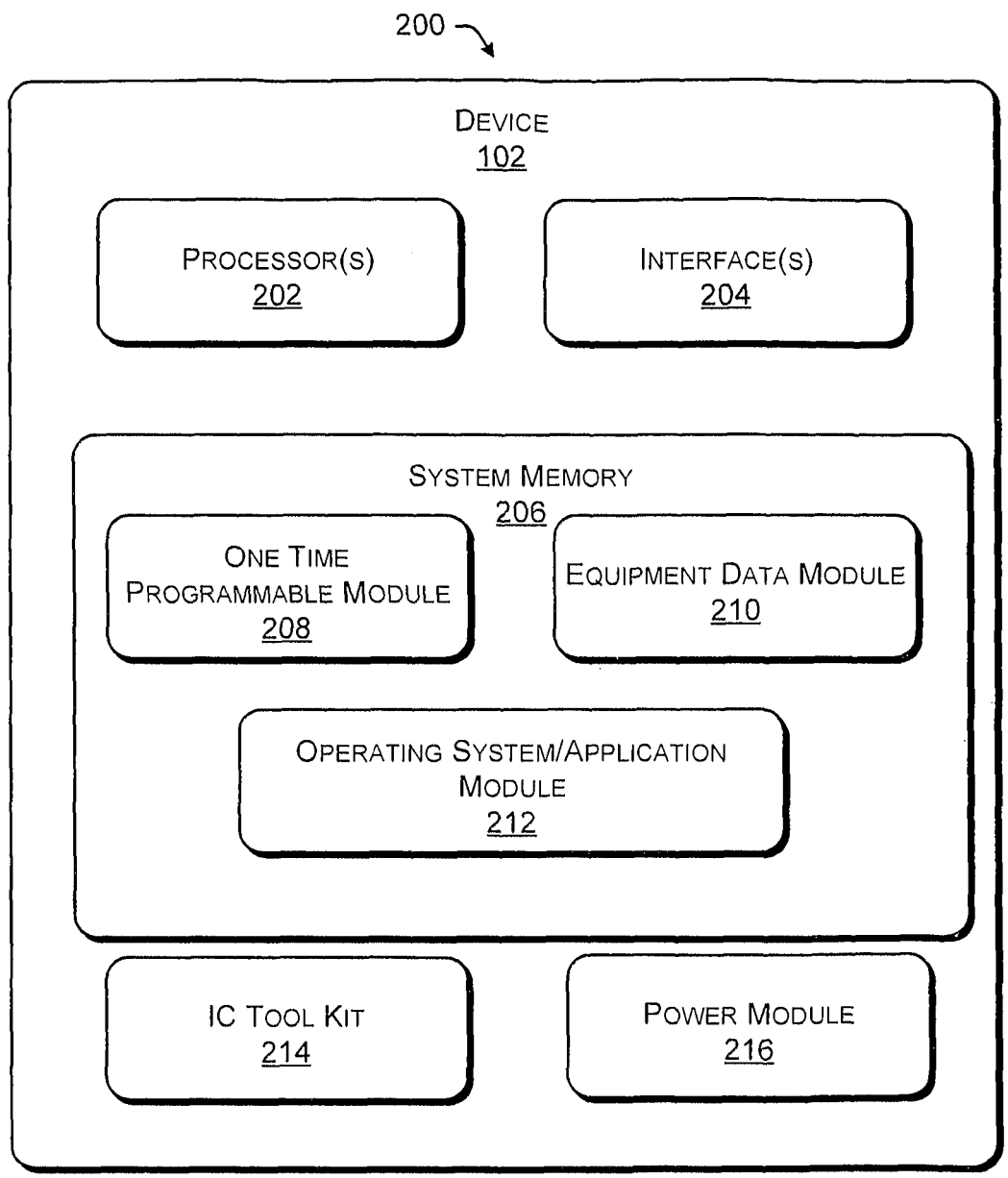
FIG. 2 is a block diagram of an exemplary communication device of FIG. 1, in accordance with one embodiment of the subject matter.

FIG. 2 is a block diagram 200 of an exemplary device 102, according to one embodiment. The device 102 may include one or more processor(s) 202, one or more interface(s) 204, an Integrated Card (IC) tool kit 214, a power management unit (PMU) 216, and a system memory 206, which may further include one or more supporting modules.

The processor(s) 202 may include, for example, microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 206.

The interface(s) 204 may include a variety of software and hardware interfaces, for example, network interfaces like a radio transceiver circuit, user interfaces, such as input/output systems, application programming interfaces like an internal equipment clock, a calendar etc., or a combination of such interfaces. The interface(s) 204 facilitate user interaction with the device 102 as well as reception and transmission of communication signals over the network 104.

The system memory 206 may include any computer-readable medium known in the art including, for example, volatile memory (e.g., RAM) and/or non-volatile memory (e.g., flash, etc.). In one implementation, the system memory 206 includes a one time programmable module 208, an equipment data module 210, and an Operating System (OS)/Application module 212.

The one-time-programmable (OTP) module 208 comprises one time programmable (OTP) memory that stores security data related to the unlocking, of the device 102. The OTP memory can be a read only memory (ROM) and is well known in the art. The OTP module 208 protects security data from being hacked into or reprogrammed, and thus ensures that the user abides by the validity period of locking as the data stored in the OTP memory can not be tampered with. The security data may include a time duration or recovery time after which the device 102 is to be unlocked, a time stamp indicating when the lock was implemented and another time stamp indicating the time when the lock will be disabled. The device 102 may also store any other data, essential to implement time-based locking/unlocking of the device 102. The security data can be stored in an encrypted format in the OTP module 208.

During operation, the security data is used to determine the current mode of operation, i.e., whether the device 102 is to be operated in the locked mode or the unlocked mode. The current mode of operation depends on the expiry of the validity period. A representative OTP memory is commercially available and can be obtained from manufacturers such as Matrix Semiconductors Inc. or Analog Devices, Inc. The OTP memory may be programmed using a programming tool to program the OTP memory or programming the OTP memory while manufacturing the communication device, in one implementation.

The equipment data module 210 stores equipment identity data like the equipment identity number (EIN) related to the device 102. For example, in case of cellular phones, the equipment data module 210 may store the IMEI number. The equipment data module 210 may also include other data required for operation of the device 102. The OS/Application module 212 includes an operating system, utility applications, and user interface applications required for the functioning of the device 102.

Further, the device 102 may include the IC tool kit 214 to enable the usage of the IC card for connection to a communication network once the device 102 has been unlocked. For the purposes of illustration, the IC tool kit 214 tool kit can be a combination of hardware interfaces to house an IC card and to read subscriber identity data like a subscriber identity number (SIN) or an IMSI number stored in the IC card.

Further, the device 102 may also include the PMU 216 that manages the power supply to the device 102. The PMU 216 can be implemented in the form of an entirely hardware embodiment, an entirely software embodiment, or an embodiment containing both hardware and software elements. In one embodiment PMU 216 comprises a power source. The power source can preferably be any power source, such as battery, capable of supplying the power required by the device 102.

In the locked mode of operation, the power supply to the IC tool kit 214 is interrupted by the PMU 216. Due to interruption in the supply of power, the IC tool kit 214 is deactivated. In the deactivated state, the functionality provided by the IC tool kit 214 is not available. As a result, the IC Card inserted in the IC tool kit 214 can not be used for the purposes of communication. Therefore, in the locked period, the device 102 transmits the IMEI number from the equipment data module 210 to the network 104 for authentication by the home network service provider.

In the unlocked mode of operation, that is, after the expiry of the validity period, the PMU 216 maintains the required supply of power to the IC tool kit 214. The supply of power to the IC tool kit 214 renders it activated. In the activated state, the device 102 can read the IC card inserted in the IC tool kit 214. Therefore, the device 102 can transmit the IMSI number, which is read from the IC card. In another implementation, the device 102 uses the IMEI number without using the IC tool kit 214, even in the unlocked mode. This may happen, for example, in a situation where the user wishes to continue with the home network service provider, even after expiry of the validity period.

In one implementation, the PMU 216 activates or deactivates IC tool kit 214 by monitoring the power supplied to the IC tool kit 214. However, it will be apparent to those skilled in the art that various other measures may be used to activate or deactivate the IC tool kit 214.

Figure 3:
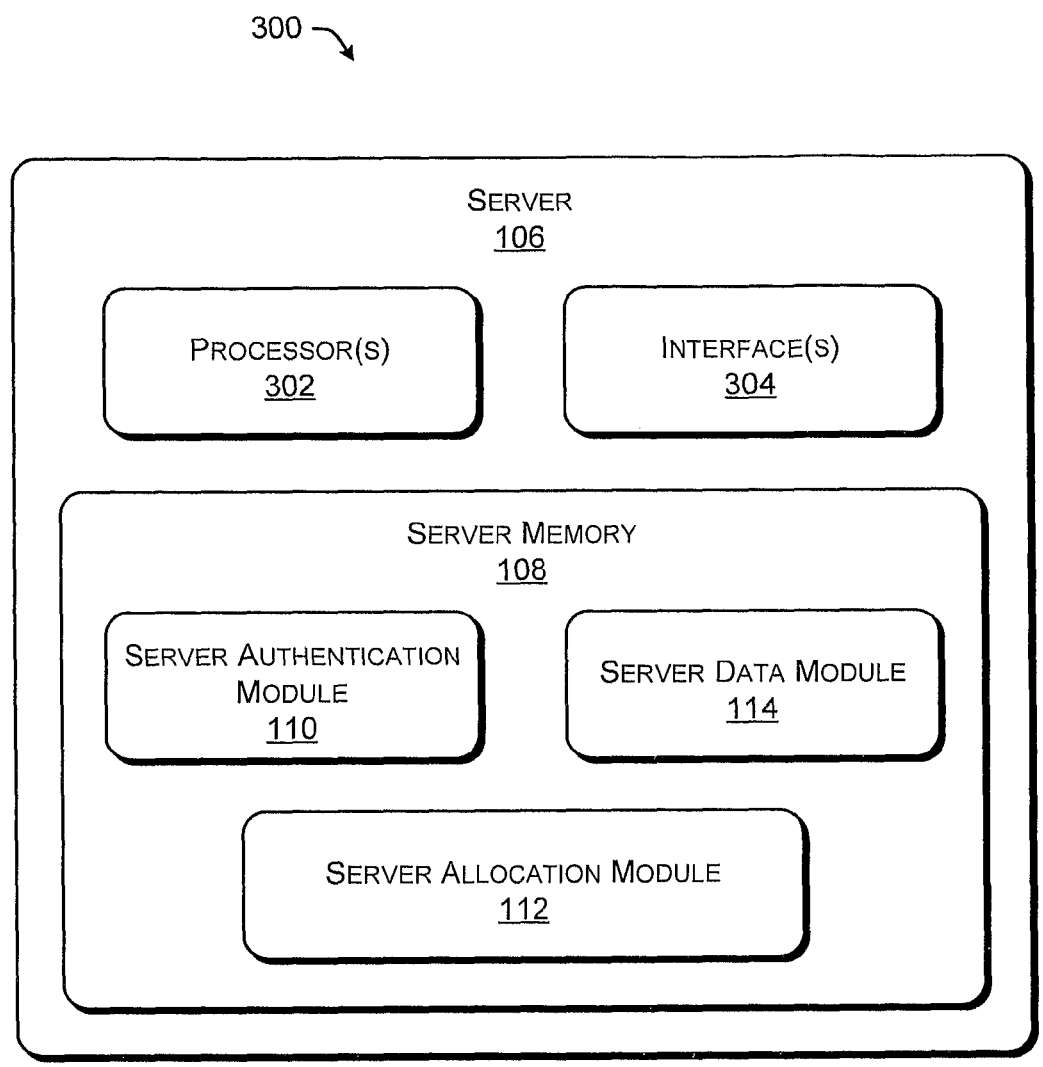
FIG. 3 is a block diagram of an exemplary communication server, in accordance with one embodiment of the subject matter.

FIG. 3 is a block diagram 300 of the exemplary server 106, according to one embodiment. The server 106 may include one or more processor(s) 302, one or more interface(s) 304, and the server memory 108 that may further include the server authentication module 110, the server allocation module 112, and the server data module 114.

The processor(s) 302 may include, for example, microprocessors, microcomputers, microcontrollers, digital signal processors, central processing units, state machines, logic circuitries, or any other devices that manipulate signals based on operational instructions. Among other functions, the processor(s) 302 is configured to fetch and execute computer-readable instructions stored in the server memory 108.

The interface(s) 304 may include a variety of software and hardware interfaces, for example, network interfaces like a radio transceiver circuit, server operator interfaces like an input/output system, application programming interfaces like an internal server clock, etc., control interfaces for monitoring and maintaining the server, or a combination of many such interfaces. The interface(s) 304 facilitate maintenance and operator control of the server 106 as well as reception and transmission of communication signals over the network 104.

The server memory 108 may include any computer-readable medium known in the art including, for example, volatile memory (e.g., RAM) and/or non-volatile memory (e.g., flash, etc.).

The server authentication module 110, also referred to as an authentication module 110, is used to authenticate a connection on the basis of identification of data or identity number(s) received over the network 104. The authentication module 110 determines whether the identity number received is an equipment identity number (EIN) or a subscriber identity number (SIN), which, as described above, may correspond to whether the device 102 is operating without the IC card, such as in the locked mode, referred to as IC tool kit deactivated mode hereinafter, or with the IC card in the unlocked mode, referred to as IC tool kit activated mode hereinafter.

After determining the nature of the identity number, the authentication module 110 authenticates the identity number using a relevant subscriber information database included in the server data module 114. On authentication, the server allocation module 112 is used to dynamically allocate the IMSI number to a connection request authenticated via the EIN. The dynamic nature of allocation entails that for a connection to be established, the temporary IMSI number is allocated out of a pool of available IMSI numbers acquired in real-time from a database of the server data module 114. The temporary IMSI number so allocated can be configured to be valid only for the purpose of a current connection so that subsequent connections carried out under similar conditions may require a different IMSI number being allocated to the same device 102.

In addition to the above mentioned database, the server data module 114 may also include databases required for functions like billing, call routing, equipment location identification, and so forth.

Figure 4:
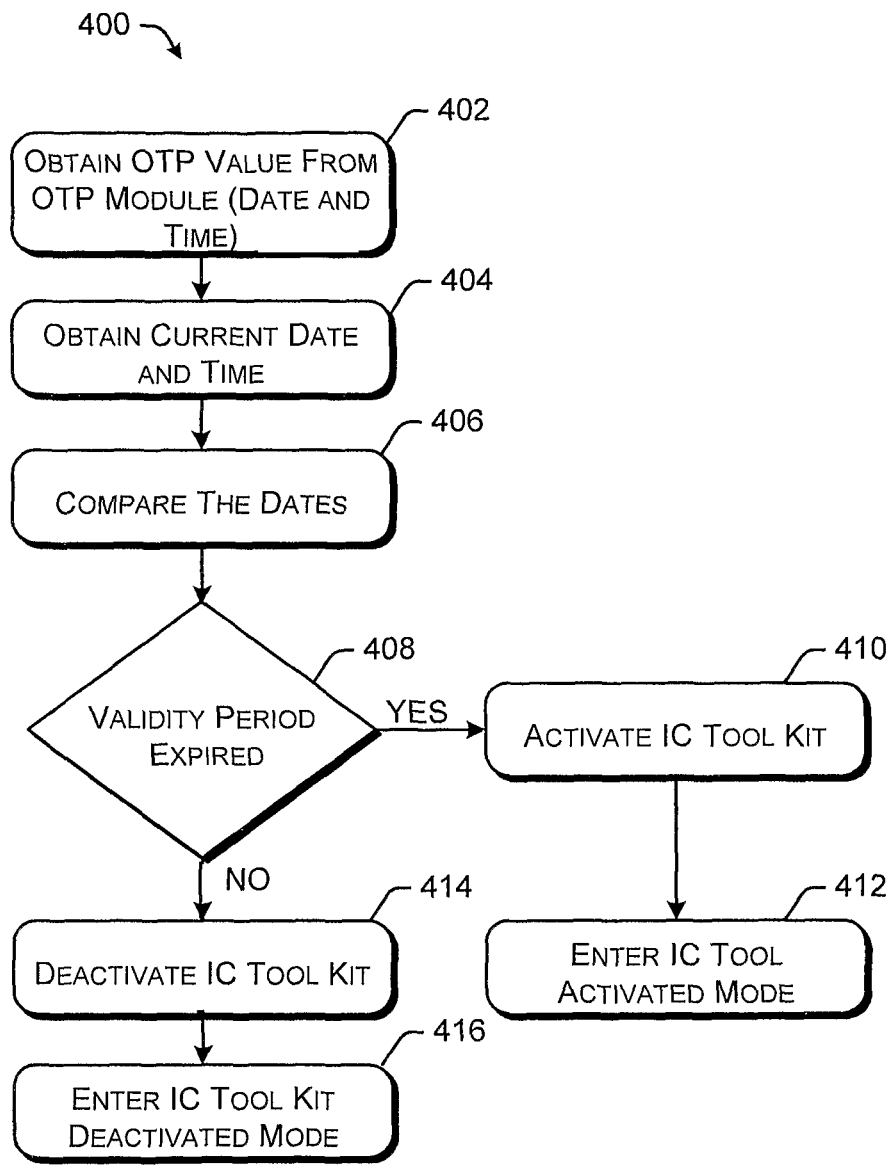
FIG. 4 illustrates an exemplary method of activating or deactivating an IC tool kit of the communication device of FIG. 1, in accordance with one embodiment of the subject matter.

FIG. 4 illustrates an exemplary method 400 for activating or deactivating the IC tool kit 214, according to one embodiment. Depending on the state of activation of the IC tool kit 214, the device 102 is in an IC tool kit activated mode or in an IC tool kit deactivated mode.

An exemplary method 400 for activating or deactivating the IC tool kit 214 is initiated at a process block 402. The initiation may be a result of events occurring on either the server 106 or the device 102. Initiation of the exemplary method 400 may occur periodically after a week, a month or so. Initiation of the method 400 may also be initiated as and when the device 102 is switched on, or the device 102 avails roaming facility, or the like. Further, the initiation may be a result of a standard operating procedure of the device 102, for example, during power up, or a result of a user driven event, or a result of a combination of such events.

At block 402, once the initiation of method 400 is triggered, the OTP module 208 is read and date and time values stored in the OTP module 208 are obtained. At block 404, current date is obtained. In an exemplary embodiment, current date and time can be obtained from a real time clock in the device 102 or from the network service provider. At block 406, the date obtained from the OTP module 208 and the current date obtained are compared.

At block 408, expiry of the validity period is assessed and accordingly either step 410 or step 414 is executed. In case the outcome of the block 408 indicates that the validity period has expired, the IC tool kit 214 is activated at process block 410. Thereafter, at step 412, the device 102 enters the IC tool kit activated mode of operation. This mode of operation of the device may be implemented, for example, through setting of a flag value stored in the system memory 206.

At block 408, in case the outcome indicates that the validity period has not expired, the decision block transfers control directly to step 414. At block 414, the IC tool kit is deactivated and thereafter at step 416, the device 102 enters the IC tool kit deactivated mode. Thus, as long as the device 102 is in the IC tool kit deactivated mode, the IC tool kit 214 remains disabled and does not read any IC card inserted therein. During the IC tool kit activated mode, the IC tool kit 214 of the device 102 is activated. As illustrated above, the device 102 will enter the IC tool kit activated mode only after the expiry of the validity period.

In one embodiment, the activation and deactivation of the IC tool kit 214 is achieved by managing the supply of power to the IC tool kit module 214. In one embodiment, the OS/Application module 212 reads data stored in the OTP module 208 and checks for the expiry of the Validity Period. Subsequently, in response to the outcome of the checking process, a flag value stored in the system memory 206 is set. In one embodiment, if the value is set as '0', the OS/Application module 212 directs the PMU 216 to stop the power supply to the IC tool kit 214, deactivating the IC tool kit 214. Similarly, if the flag value is set as '1', the OS/Application module 212 will direct the PMU 216 to maintain the power supply to the IC tool kit 214 so that the IC tool kit 214 is activated.

Though the above illustration has been described with reference to the control of the PMU 216 by the OS/Application module 212, it is understood that aforementioned implementation of managing the power supply to the IC tool kit 214 can be implemented in one or more ways.

Figure 5:
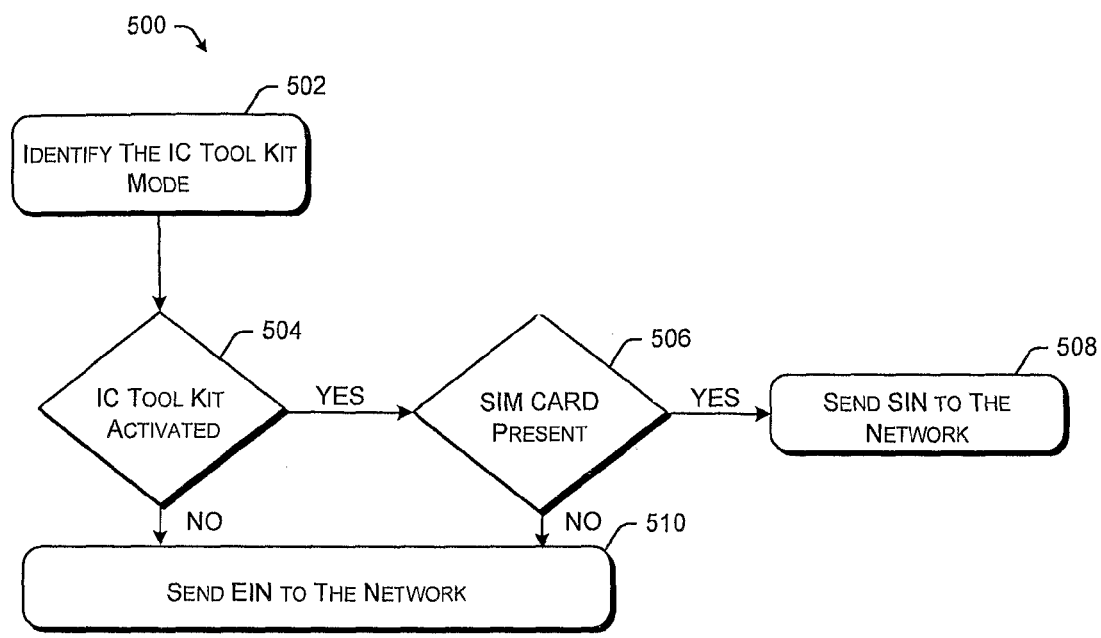
FIG. 5 illustrates an exemplary method of transmission of a unique identification number to a network from the communication device of FIG. 1, in accordance with one embodiment of the subject matter.

FIG. 5 illustrates an exemplary method 500 for transmitting the identification number from the device 102 to the network 104 depending on the mode of the operation of the device 102, according to one embodiment.

Initiation of the exemplary method 500 occurs at block 502. Initiation may occur, for example, every time the device 102 is switched on, during roaming, or during the reception of the network after the period of no network coverage. Further, the initiation may be a result of a standard operating procedure of the device, for example, during power up, or a result of a user driven event, or a result of a combination of such events.

At block 502, the current mode of the operation of the device 102 is determined. The determination of the current mode of operation of the device 102 wherein the device 102 is in the IC tool kit Activated or IC tool kit Deactivated mode can be carried out by various ways. For example, the current mode of operation may be determined by assessing a flag value stored in the system memory 206 of the device 102 by the processor 202.

At block 504, mode of the IC tool kit is assessed. In case the outcome of the decision block 504 indicates that the device 102 is in the IC tool kit deactivated mode, block 510 is executed. At block 510, the device 102 transmits the IMEI to the network 104. In case the outcome of the decision block 504 indicates that the device 102 is in the IC tool kit activated mode, 506 is executed.

At block 506, presence of an IC card such as SIM Card in the IC tool kit 214 is checked. If the IC Card is present in the IC tool kit 214, the control is transferred to the block 508, else the control is transferred to block 510. In case an IC Card is detected in the IC tool kit 214, at block 508, the device 102 transmits the IMSI number associated with the IC Card, to the network 104. Further, the IMSI number can be used for authentication and connection establishment as in the case of a regular mobile phone communication known in the art.

Subsequently, If the IC Card is not present in the IC tool kit 214, block 510 is executed. Further, at block 510, the device 102 transmits the IMEI number, to the network 104.

Figure 6:
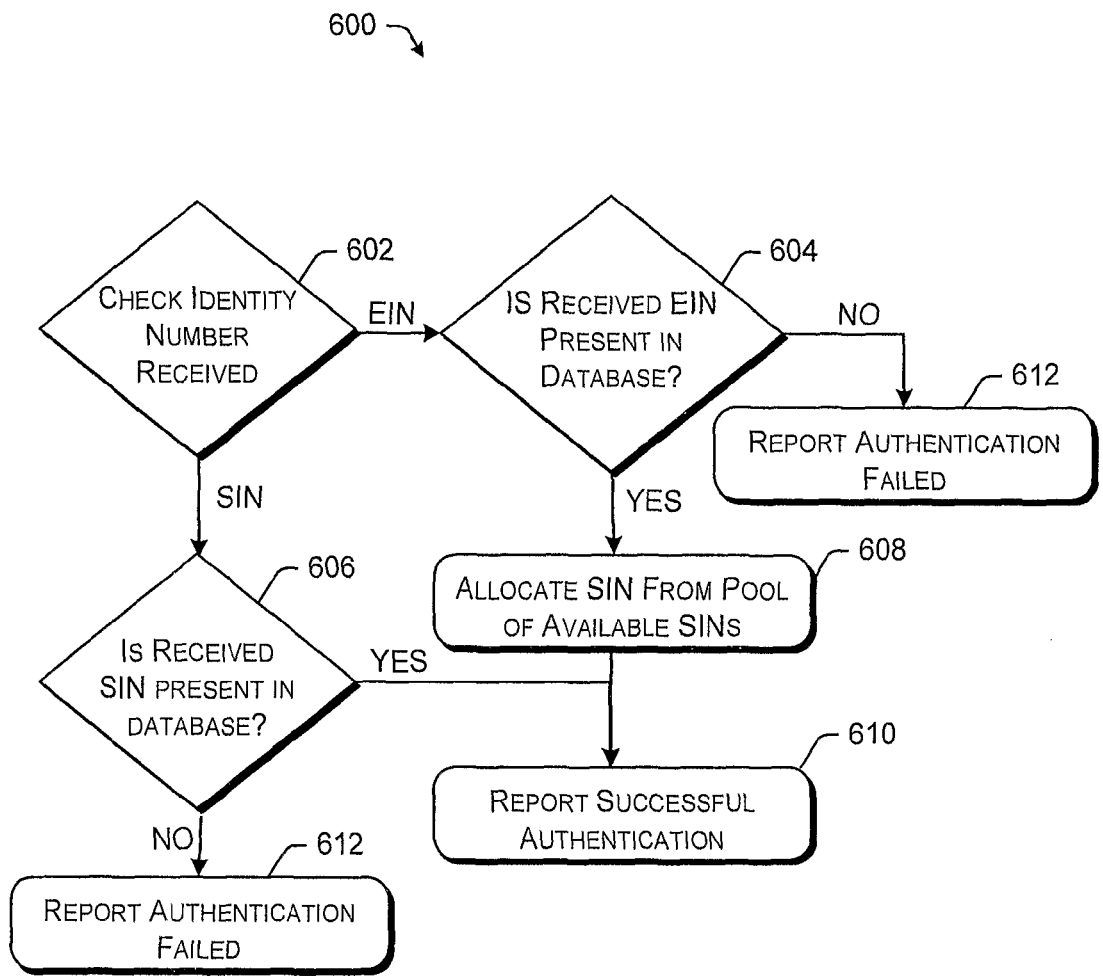
FIG. 6 illustrates an exemplary method of authentication of the communication device of FIG. 1 by the network of FIG. 5, in accordance with one embodiment of the subject matter.

FIG. 6 illustrates an exemplary method 600 illustrating the authentication of the device 102 by the network 104 on the basis of an identity number received from the device 102, according to one embodiment. The exemplary method 600 is implemented at the server 106.

At block 602, the identity number is received by the server 106 through its interface(s) 304. At decision block 602, the identity number received is determined as being either the EIN or the SIN and accordingly either block 604 or block 606 is executed. Blocks 602, 604, and 606 can be implemented in the server authentication module 110 of the server 106.

In case the received identity number is the EIN, block 604 is executed where the EIN is searched for in a user database implemented in the server data module 114. In case the EIN is not found in the user database, the authentication fails and report of failure of authentication is communicated back to the device 102 at block 612.

In case the EIN is found in the user database, thereby indicating that the device 102 belongs to a valid user, control is passed on to the server allocation module 112. The SIN is dynamically allocated, as described previously, to the user at block 608. The report of completion of successful authentication is communicated to the device 102, at block 610.

Referring back to block 602, in case the received identity number is determined to be the SIN, block 606 is executed. At block 606, the SIN is searched for in the user database implemented in server data module 112. In case the SIN is not found in the user database, the authentication fails and the report of failure of authentication is communicated back to the device 102 at block 612.

In case the SIN is found in the user database, thereby indicating that the device 102 belongs to the valid user, block 610 is executed, according to which the report of completion of successful authentication is communicated to the device 102.

It is to be noted that the user database is a database that may be maintained by the home network service provider. The user database may also include, the information stored in home location register (HLR), which stores details of each mobile phone subscriber that is authorized to use a GSM core network such as the network 104. The user database may also include information stored in a visitor location register (VLR), which is a temporary database of the users who have roamed into the particular area which the network serves. In one embodiment, the user database may also be shared across various network service providers to facilitate the call making process while roaming.

In one embodiment, during roaming, the device 102 communicates with the network service available in an area of its current location and transmits the EIN number for authentication. In another embodiment, the network service available in the area will request the home network service provider of the device 102 and will request for the IMSI number for the received EIN of the device 102. Further, in response to the successful receipt of the IMSI number from the home network service provider, the call will be connected. However, in another embodiment, a neighboring non-home network service provider may itself allocate an IMSI number dynamically, in response to the EIN number received from the device 102.

In one embodiment, the neighboring non-home network service provider may request for information about the device 102 for authentication from the user database maintained by the home network service provider. In another embodiment, the user database may be shared across various network service providers to facilitate seamless connectivity to the user of the device 102. Further, the neighboring non-home network service provider itself may use the shared user database to authenticate the request received from the device 102.

In one embodiment, the central database, which may also include information stored in the HLR or the VLR, is shared across the various network service providers. To provide roaming facilities to the user of the device 102, non-home network service providers may also offer the facility of dynamic SIN allocation for the received EIN from the device 102 at the server 106 via the network 104. Non-home network service provider may use the central database to verify that the received EIN is of the valid user and subsequently, the IMSI number is allocated to the device 102 in order to provide seamless connectivity while roaming or during call handoff procedures.

In one exemplary embodiment, the central database may also be maintained for the users who have entered in to a contract with the various network service providers and who have their devices locked for the validity period. Non-home network service providers may use the central database to offer connectivity to such users via dynamic SIN allocation procedure as explained earlier in this disclosure The exemplary methods 400, 500 and 600 provided with reference to FIGS. 4, 5 and 6 are described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium and can be loaded or embedded in an appropriate device for execution.

Order in which methods are described is not intended to be construed as a limitation, and any number of the described method blocks can be combined in any order to implement the methods, or an alternate method. Additionally, individual blocks may be deleted from the methods without departing from the spirit and scope of the subject matter described herein. Furthermore, the methods can be implemented in any suitable hardware, software, firmware, or combination thereof.

Although embodiments for implementing virtual locking of a communication device have been described in language specific to structural features and/or methods, it is to be understood that the invention is not necessarily limited to the specific features or methods described. Rather, the specific features and methods are disclosed as exemplary implementations for the same.

I claim:

1. A communication device, comprising:
   an interface operative to communicate with at least a communication server of a communication network of a network service provider;
   memory operative to store data denoting a validity period, and an International Mobile Subscriber Identity (IMSI) received from the server;
   a Subscriber Identity Module (SIM) integrated circuit card tool kit operative to physically house and electrically connect a SIM card when enabled; and
   a processor operatively coupled to the memory and operative to determine the validity period, and further operative to,
   during the validity period,
      disable the SIM housing tool kit,
      cause the interface to transmit to the server an equipment identification number (EIN) and not an International Mobile Subscriber Identity (IMSI),
      cause the interface to receive from the server an IMSI dynamically allocated to the device in response to the EIN, and to store the IMSI in memory for use to facilitate communications over the network, and
   upon expiry of the validity period,
      automatically enable the SIM tool kit.

2. The communication device of claim 1, wherein the communication device is locked to a network service provider for communication during the validity period.

3. The communication device of claim 1, wherein the processor is operative to disable the SIM housing tool kit by interrupting a supply of power to the SIM housing tool kit.

4. The communication device of claim 1, wherein the processor is operative to enable the SIM tool kit by restoring a supply of power to the SIM tool kit.

5. A method of communication between a communication device and a network, comprising:
   disabling an integrated circuit card tool kit operative to physically house and electrically connect an integrated circuit card containing subscriber information for a validity period by interrupting a supply of power to the integrated circuit card tool kit; and
   transmitting an equipment identity number, in lieu of subscriber information, to the network to initiate a communication process during the validity period; and
   enabling the integrated circuit tool kit automatically on expiry of the validity period.

6. The method of claim 5, wherein the enabling the integrated circuit card tool kit comprises restoring a supply of the power to the integrated card tool kit upon expiry of the validity period.

* * * * *